US008220852B2

(12) United States Patent
Fenstemaker

(10) Patent No.: US 8,220,852 B2
(45) Date of Patent: Jul. 17, 2012

(54) TOOL WITH INTERCHANGEABLE WORK HEADS

(76) Inventor: Daniel P Fenstemaker, Paris, OH (US)

( * ) Notice: Subject to any disclaimer, the term of this patent is extended or adjusted under 35 U.S.C. 154(b) by 134 days.

(21) Appl. No.: 12/760,809

(22) Filed: Apr. 15, 2010

(65) Prior Publication Data

US 2010/0269648 A1 Oct. 28, 2010

Related U.S. Application Data

(63) Continuation-in-part of application No. 12/572,920, filed on Oct. 2, 2009.

(60) Provisional application No. 61/102,272, filed on Oct. 2, 2008, provisional application No. 61/147,312, filed on Jan. 26, 2009, provisional application No. 61/173,587, filed on Apr. 28, 2009.

(51) Int. Cl.
*A01B 1/20* (2006.01)

(52) U.S. Cl. .......................................... 294/51; 294/57

(58) Field of Classification Search .................... 294/57, 294/51, 49; 15/144.4; 403/109.6, 109.4, 403/367, 368, 370, 371, 378
See application file for complete search history.

(56) References Cited

U.S. PATENT DOCUMENTS

| | | | | |
|---|---|---|---|---|
| 268,301 | A | | 11/1882 | Smith |
| 1,229,843 | A | | 6/1917 | Whitaker |
| 1,331,806 | A | | 2/1920 | Curtis |
| 1,530,225 | A | | 1/1924 | Belakoy |
| 2,313,858 | A | | 3/1943 | Armstrong |
| 2,606,050 | A | | 8/1949 | Morris |
| 2,682,414 | A | | 5/1950 | Richardson |
| 3,751,748 | A | * | 8/1973 | Roe et al. .................. 15/230.11 |
| 4,162,132 | A | | 7/1979 | Kress |
| 4,406,559 | A | | 9/1983 | Geertsema |
| 4,466,377 | A | | 8/1984 | Kolb |
| 4,570,988 | A | * | 2/1986 | Carmien ........................ 294/57 |
| 5,105,493 | A | | 4/1992 | Lugtenaar |
| 5,579,848 | A | * | 12/1996 | Hsu .............................. 172/378 |
| 5,743,580 | A | | 4/1998 | Evans |
| 5,816,633 | A | | 10/1998 | Odom |
| 6,289,540 | B1 | | 9/2001 | Emonds |
| 7,669,506 | B2 | * | 3/2010 | Cox ................................ 81/45 |

* cited by examiner

*Primary Examiner* — Saul Rodriguez
*Assistant Examiner* — Gabriela Puig
(74) *Attorney, Agent, or Firm* — Zollinger & Burleson Ltd.

(57) ABSTRACT

A construction-grade hand tool has interchangeable tool heads that can withstand significant impact, pulling, and twisting forces. The tool heads may include a shovel, a rake, a hoe, a bow saw, a broom, a fork, pruning shears, and other construction and fire fighting tool heads. A tool head adapter securely connects these tool work heads to a handle which may be a telescoping handle. The tool head adapter is connected to the tool head in a manner that provides a strong, impact-resistant connection between the adapter and the tool head. The handle may include a shock absorber structure. The adapter is configured to be securely and tightly received by a clamping and/or quick-release receptacle on the end of the handle.

20 Claims, 9 Drawing Sheets

TOOL WITH INTERCHANGEABLE WORK HEADS

CROSS REFERENCE TO RELATED APPLICATIONS

This application is a continuation-in-part application that claims priority to U.S. application Ser. No. 12/572,920 filed Oct. 2, 2009; which claims the benefit of U.S. provisional applications 61/102,272 filed Oct. 2, 2008, 61/147,312 filed Jan. 26, 2009, and 61/173,587 filed Apr. 28, 2009; the disclosures of each are incorporated herein by reference.

BACKGROUND OF THE INVENTION

1. Technical Field

The invention generally relates to hand tools and, more particularly, to a hand tool with interchangeable work heads and telescoping handles. Specifically, the invention relates to construction-grade hand tools having interchangeable work heads with adapters designed to maintain a secure connection between the work head and the handle that can withstand the impact, twisting, and pulling forces imparted on construction-grade tools.

2. Background Information

Shovels, rakes, hoes and the like have been made non-interchangeable with wooden, non-telescopic handles for thousands of years. More recent versions of such tools have handles made of steel, aluminum, or fiberglass. Tools with interchangeable work heads are also known in the art. Those in the construction industry, landscaping, and fire fighting professions desire tools that can withstand extreme working conditions wherein significant impact, pulling, and twisting forces are imparted on the tools during their normal use. Users of this type have generally not adopted tools with interchangeable work heads because the tools have not been designed for heavy work and significant forces. Workers in the fire fighting industry wish to have multiple tools in a mobile package. One problem with existing tools having interchangeable heads is the ability of the connector that secures the tool head to the tool handle to withstand pulling forces.

SUMMARY OF THE INVENTION

The invention provides a construction-grade hand tool having interchangeable work heads that can withstand significant impact, pulling, and twisting forces. The work heads can be quickly interchanged. As such, one configuration of the invention provides a professional-grade hand tool that includes a plurality of tool work heads; each of the tool work heads being connected to a tool head adapter; a telescoping handle having a tool head adapter locking mechanism; and each of the plurality of tool work heads being interchangeably lockable to the telescoping handle with the tool head adapter locking mechanism. The work heads may include a shovel, a rake, a hoe, a bow saw, a broom, a fork, pruning shears, and other construction and fire fighting tool work heads. The invention provides a tool head adapter that securely connects these tool work heads to a handle which may be a telescoping handle. The tool head adapter is connected to the tool work head in a manner that provides a strong, impact-resistant connection between the adapter and the tool work head. These connections may be welds, pins, bolts, screws, or interference fits as dictated by the type of work head being used. The other end of the adapter is configured to be securely and tightly received by a clamping and/or quick-release receptacle on the end of the handle.

The invention provides an adapter is configured to prevent the tool work head from rotating when the tool work head is secured to the handle. In one configuration, the adapter includes a cylindrical male shank that is received in a female receptacle carried by the handle. The female receptacle has a rotational clamping member that clamps onto the male shank to provide a secure connection between the tool handle and the tool work head.

In one configuration, the invention provides an adapter having a combined rotational clamping and push button locking features. In one configuration, the tool head adapter includes a recess that receives an end of a pivoting locking member carried by the handle. The pivoting locking member adds a secondary secure locking connection between the handle and the tool work head. In another configuration, the user choose to not use the clamping mechanism and simply use the pivoting locking member to hold the tool work head to the handle. This option is useful for some tool work heads. In still another configuration, the pivoting locking member may be provided without the clamping member.

The invention also provides a hand tool having a handle with an internal shock absorbing member that receives and buffers longitudinal impact forces received by the tool work head. In one configuration, the shock absorbing member is a structure disposed inside the handle tube closest to the tool adapter with adapter abutting one end of the structure and the other end of the structure abutting the device that clamps the handle tubes together.

The invention provides such a tool with a telescoping handle having tubular fiberglass handle sections. The handle may be configured to provide handle adjustments of 2-4 feet, 4-8 feet, 6-12 feet, and 8-16 feet.

The invention provides a kit having a hand tool that itself includes a plurality of interchangeable work heads and a telescoping handle that all fit within a pack adapted to be carried by a single person. The kit also may include a second telescoping handle. This kit allows the user to readily transport a variety of construction grade tools to a remote location while walking.

In one configuration, the invention provides a hand tool that includes a tool work head; a tool head adapter having a first shank and a second shank with a shoulder defined between the first and second shanks; the tool head adapter being connected to the tool work head; a handle having a tool head adapter locking mechanism carried by an inner tube; a shock absorbing structure disposed inside the inner tube; the shock absorbing structure defining an opening; the second shank of the adapter disposed in the opening defined by the shock absorbing structure; at least a portion of the first shank being disposed inside the inner tube; the shoulder of the adapter abutting the shock absorbing member; and the tool head adapter locking mechanism having a clamped configuration and an unclamped configuration; a portion of the tool head adapter locking mechanism surrounding a clamping portion of the first shank of the adapter and being clamped against the clamping portion of the first shank of the adapter to secure the tool head adapter to the inner tube.

Another configuration of the invention provides a hand tool that includes a tool work head; a tool head adapter having a first shank and a second shank with a shoulder defined between the first and second shanks; the tool head adapter being connected to the tool work head; a handle having a tool head adapter locking mechanism carried by an inner tube; the first and second shanks of the tool head being frictionally received by the handle with the shoulder abutting a portion of the handle; and the tool head adapter locking mechanism having a clamped configuration and an unclamped configuration; a portion of the tool head adapter locking mechanism surrounding a clamping portion of the first shank of the adapter and being clamped against the clamping portion of the first shank of the adapter to secure the tool head adapter to the inner tube.

BRIEF DESCRIPTION OF THE DRAWINGS

Similar numbers refer to similar parts throughout the specification.

DETAILED DESCRIPTION OF THE INVENTION

Figure 1:
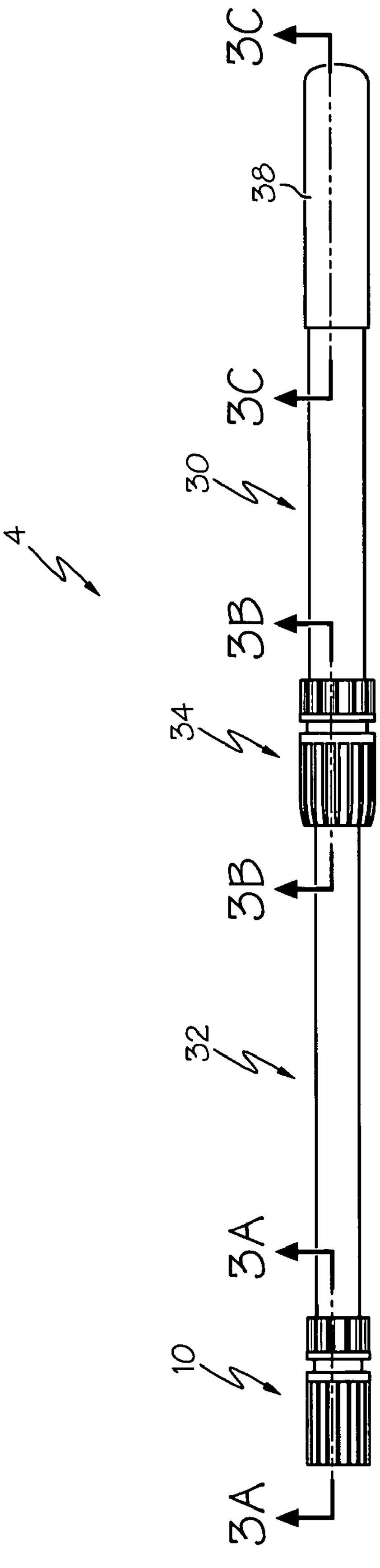
FIG. 1 is a side elevation view of the handle.
Figure 2B:
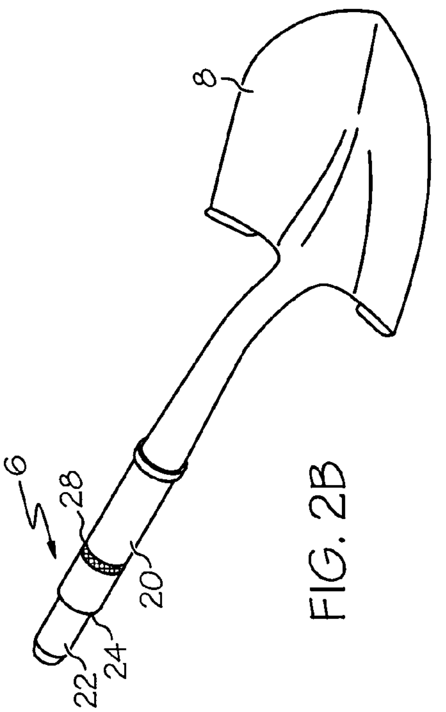
FIGS. 2A-2C show three different tool work heads secured to tool head adapters.
Figure 2C:
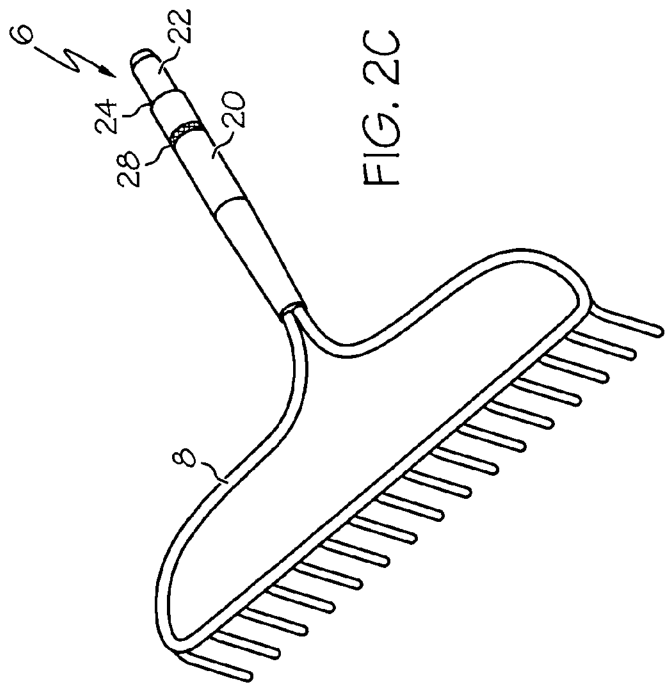
Figure 2A:
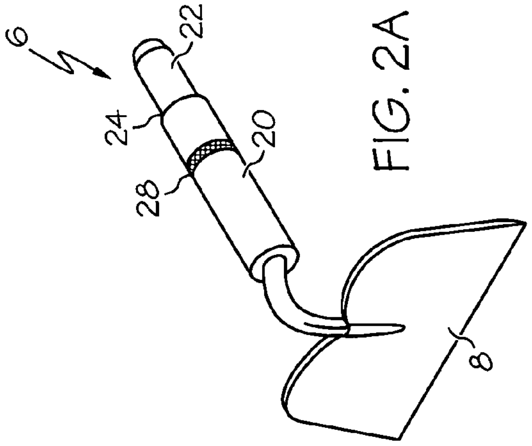

An exemplary configuration of the tool of the invention generally includes a handle 4, a tool head adapter 6, and at least one tool work head 8. Tool may be configured for a wide variety of jobs by removing one tool work head 8 and replacing it with a different tool work head 8. An adapter locking mechanism 10 is used to secure tool head adapter 6 to handle 4 in a manner that allows the tool to withstand substantial forces associated with a construction-grade tool. Tool work heads 8 may include a shovel, a rake, a hoe, a bow saw, a broom, a fork, pruning shears, and other construction and fire fighting tool work heads.

Figure 5A:
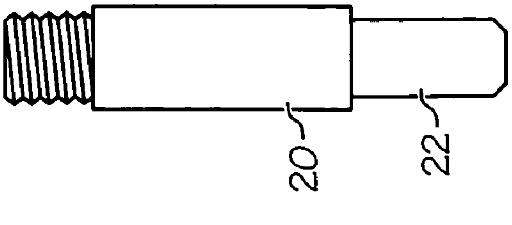
FIGS. 5A-5H depict a variety of configurations for the tool head adapter.
Figure 5B:
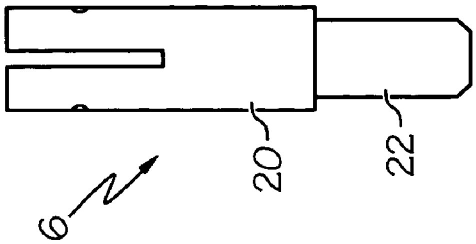
Figure 5C:
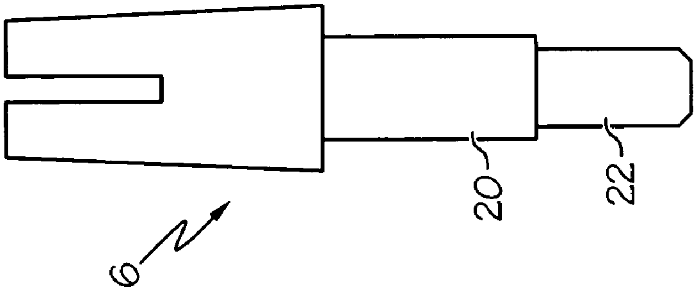
Figure 5D:
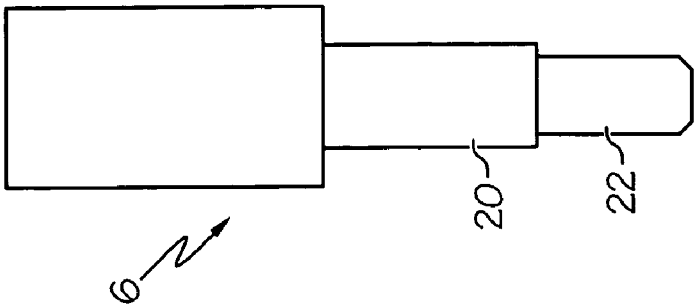
Figure 5E:
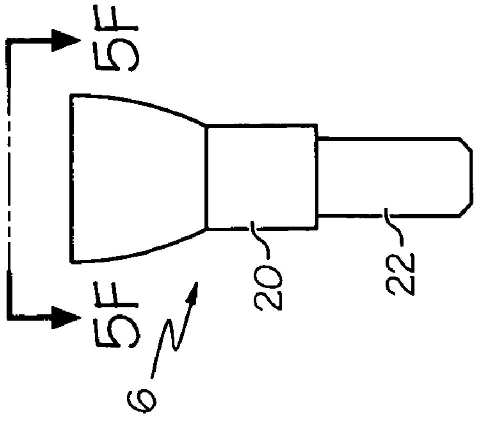
Figure 5F:
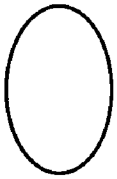
Figure 5G:
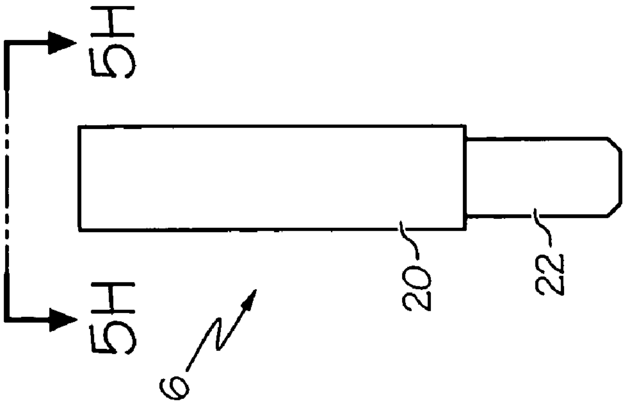
Figure 5H:
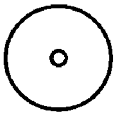

Tool head adapter 6 includes first 20 and second 22 shanks wherein second shank 22 is stepped down from first shank 20. In the exemplary configuration, first 20 and second 22 shanks have circular cross sections with the diameter of second shank 22 being smaller than the diameter of first shank 20. First shank 20 has a diameter of one inch while second shank 22 has a diameter of three-quarter inch. A shoulder 24 is defined between shanks 20 and 22. Shoulder 24 is disposed at a right angle to the longitudinal dimension of adapter 6. Tool head adapter 6 may be configured for a variety of different tool work heads 8 as shown in FIGS. 5A-5H. FIG. 5A depicts first shank 20 connected to a standard thread used to connect tool work head 8. FIG. 5B depicts a structure defining a slot configured to receive a portion of a saw blade. FIG. 5C depicts an adapter structure having a tapered end that may be used with a shovel. FIG. 5D depicts another configuration of adapter 6 having an elongated shank designed to fit into an opening of a tool work head 8. FIGS. 5E-5F depict an adapter 6 having an oval shank configured to be used with a sledgehammer, pick, mattock, or an axe. FIGS. 5G-5H depict an adapter configuration having a hole configured to receive an elongated shank such as that on a leaf rake.

The end of second shank 22 is beveled to assist in the insertion of adapter 6 into the end of handle 4. Second shank 22 may define an optional bore 26 that reduces the weight of adapter 6.

A clamping portion of the outer surface of first shank 20 of tool head adapter 6 is knurled 28, grooved, or otherwise textured to improve the frictional connection between handle 4 and adapter 6. Tool head adapter 6 is made from steel in the exemplary configuration but also may be made from aluminum, plastic, ceramic, or other hard materials.

Figure 3A:
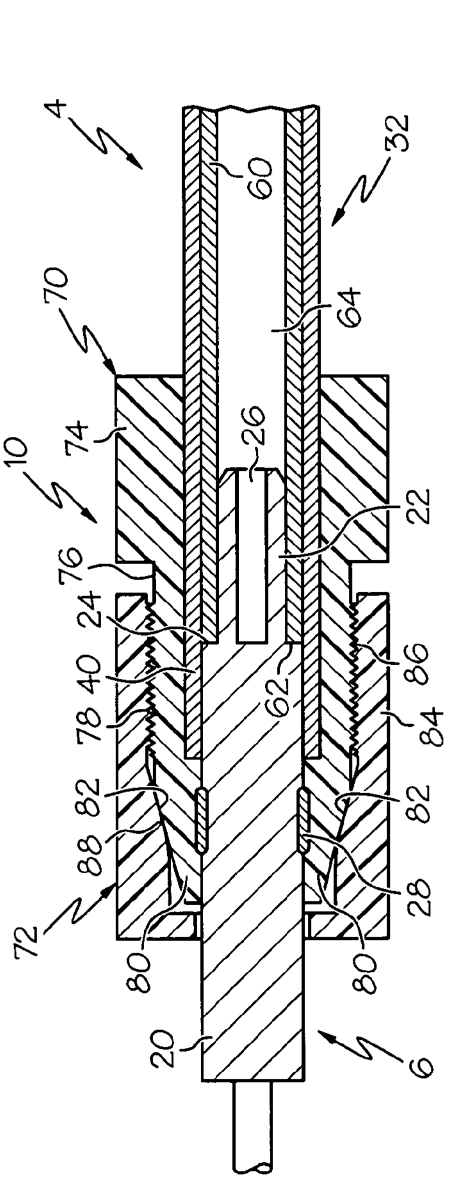
FIG. 3A is a section view taken along line 3A-3A of FIG. 1.
Figure 3B:
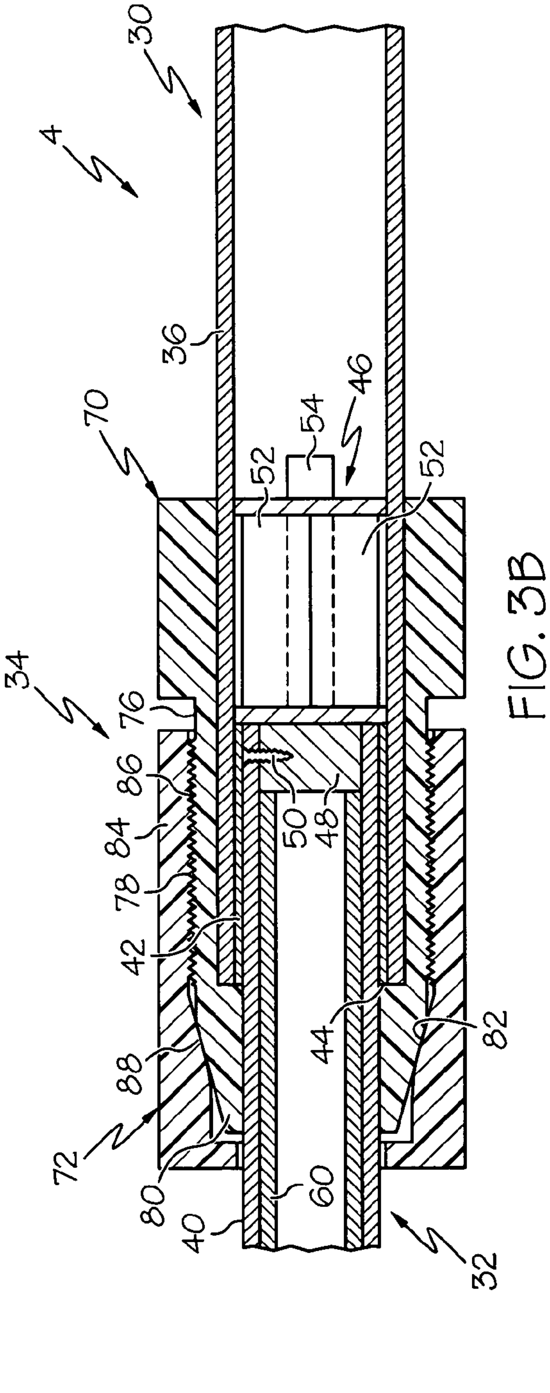
FIG. 3B is a section view taken along line 3B-3B of FIG. 1.
Figure 3C:
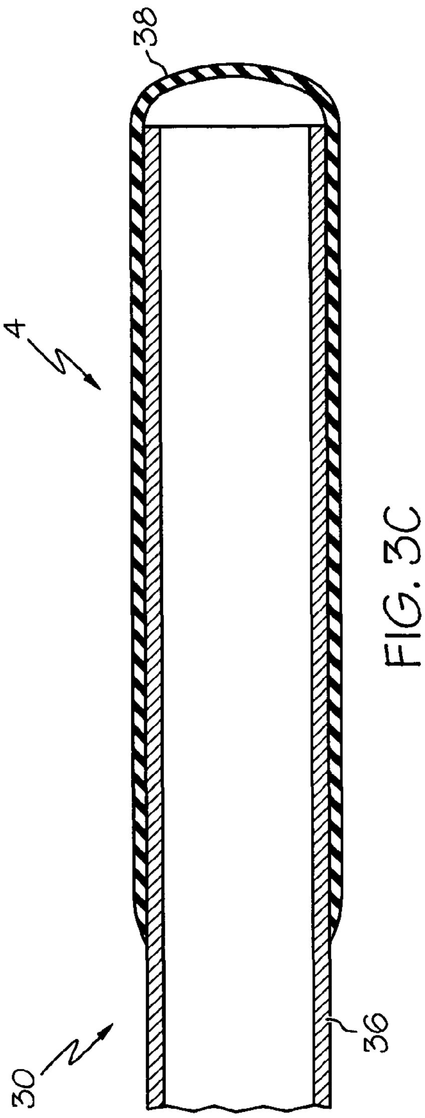
FIG. 3C is a section view taken along line 3C-3C of FIG. 1.

In a basic form, handle 4 includes a single non-telescoping tube section configured to receive tool head adapter 6. When a single tube section is used, the locking components depicted in FIG. 3B are not used. In some applications, handle 4 is configured to selectively telescope such that it may be adjusted different lengths and be locked at those lengths by the user. In the telescoping configuration, handle 4 generally includes an outer tube section 30 and an inner tube section 32 that slides at least partially into outer tube section 30 when the user unlocks a handle locking assembly 34. Handle locking assembly 34 may be used to configure the length of handle 4 at essentially any length between a minimum length dimension and a maximum length dimension. Handle 4 also includes adapter locking assembly 10 that selectively secures adapter 6 to the distal end of handle 4. Although FIG. 1 depicts only inner 32 and outer 30 tube sections, handle 4 may be provided with one or more intermediate tube sections that each telescope as described above and are each locked by a locking assembly similar to handle locking assembly 34. When an intermediate tube section is used, inner tube section 32 slides into the intermediate tube section and the intermediate tube section slides into outer tube section 30. Exemplary handles 4 may be configured to provide handle adjustments of 2-4 feet, 4-8 feet, 6-12 feet, and 8-16 feet. The collapsed condition of handle 4 allows handle 4 to be carried in a pack (backpack, gunny sack, duffel bag) with a plurality of tool heads 8. This kit of the pack, handle 4, and heads 8 may be readily carried to remote locations by a single person allowing the person to have access to multiple tools at the remote location.

Outer tube section 30 includes an outer tube 36 (or second tube) having a circular tubular cross section. Outer tube 36 may be made from fiberglass or other materials such as metal, plastics, or composites. In the exemplary configuration, outer tube 36 is a one and a half inch outer diameter fiberglass tube with a wall thickness of less than one eighth of an inch so that a one and one quarter inch outer diameter inner tube 40 (or first tube) may slide inside outer tube 36. Outer tube 36 has an outer skin and an inner skin with a corrugated or honeycombed inner layer so that tube 36 is light for its strength. The end of outer tube 36 opposite handle locking assembly 34 is at least partially wrapped by a grip 38. Grip 38 may be a rubber sleeve that is adhesively connected to the outer surface of outer tube 36.

Inner tube section 32 includes an inner tube 40 that extends between handle locking assembly 34 and adapter locking assembly 10. Inner tube 40 has an outer skin and an inner skin with a corrugated or honeycombed inner layer so that tube is light weight for its strength. As shown in FIG. 3A, the first end of inner tube 40 receives at least a portion of first shank 20 and the entire second shank 22 to form a secure connection between handle 4 and adapter 6.

The second end of inner tube 40 is disposed inside outer tube 36. A sleeve 42 is disposed around and is secured to a portion of the second end of inner tube 40. Sleeve 42 may be secured to inner tube 40 with an adhesive. Sleeve 42 does not have to be continuous. An alternative to the continuous structure of sleeve 42 is a plurality of material strips 42. Sleeve 42 allows inner tube section 32 to slide back and forth within outer tube 36 without binding. The first end 44 of sleeve 42 abuts handle locking assembly 34 to stop inner tube section 32 in its extended position as shown in FIG. 3B.

The second end of inner tube 40 is connected to an expandable locking mechanism 46 that selectively locks inner tube 40 to outer tube 36 by when it is selectively expanded to a locked condition. Expandable locking mechanism 46 includes a mounting block 48 disposed inside the second end of inner tube 40. A mechanical connected 50 is used to secure inner tube 40 to mounting block 48. Connector 50 also may be used to help secure sleeve 42 to inner tube 40. Expandable locking mechanism 46 includes a pair of shoes 52 that expand outwardly when a cam 54 is rotated to a locked position. Cam 54 is an elongated member disposed between shoes 52 and engages cam follower portions of shoes 52 to push shoes 52 outwardly when cam 54 is rotated. Shoes 52 have elastomeric gripping surfaces that engage the inner surface of outer tube 36. Cam 54 is connected to and rotates with mounting block 48 so that the user of handle 4 may rotate locking mechanism 46 to a locked position by rotating inner tube 40 with respect to outer tube 36. Rotation of tube 40 in the opposite direction unlocks mechanism 46.

A shock absorbing structure 60 is disposed inside inner tube 40. Structure 60 has an abutment end 62 against which shoulder 24 abuts when adapter 6 is inserted into handle 4 so that shock forces experienced by tool work head 8 are at least partially transferred to structure 60. Shock absorbing structure 60 may be made from PVC. Shock absorbing structure 60 may be a hollow tube or a solid structure. Structure 60 defines an opening 64 that frictionally receives second shank 22 of adapter 6. Shock absorbing structure 60 may be made from the PVC described above or a plastic, polymer, rubber, or wood material. The materials may be dense or foamed. Structure 60 receives shock forces from adapter and deadens the shock forces so that the user's hands and arms do not absorb all of the forces. As described above, structure 60 abuts expandable locking mechanism 46 and transfers a portion of the shock forces to the expandable locking mechanism 46 which further deadens the forces transferred to the user through the use of shoes 52 having the elastomeric portions.

The combination of the frictional connections between shank 20 and tube 40, the frictional connection between shank 22 and structure 60, and the abutment between shoulder 34 and end 62 provides a tight connection between handle 4 and adapter 6 that prevents tool work head 8 from wobbling with respect to handle 4.

Adapter locking assembly 10 includes inner 70 and outer 72 portions that cooperate to lock adapter 6 to handle 4 and resist rotational movement between adapter 6 and handle 4. Inner portion 70 is secured to the outer surface of inner tube 40 with an adhesive or a mechanical connector. Inner portion 70 includes a grip 74, an intermediate tube 76 having outwardly disposed thread 78, and a plurality of clamping fingers 80 that define an outer cam follower surface 82. Clamping fingers 80 define a rearward-facing ledge. The first end of inner tube 40 abuts the rearward-facing ledge of clamping fingers 80.

Outer portion 72 defines a cup 84 having inwardly disposed thread 86 configured to threadedly engage thread 78. Rotation of outer portion 72 moves outer portion 72 up and down along the length of inner portion 70 as a result of the threaded connection between threads 78 and 86. Outer portion 72 defines a cam 88 disposed to engage cam follower surface 82 when outer portion 72 is moved toward grip 74 of inner portion 70 to force clamping fingers 80 radially inwardly to clamp against first shank 20 of adapter 6. Clamping fingers 80 engage clamping portion 28. Tightening outer portion 72 against inner portion 70 thus locks inner tube 40 to adapter 6.

Handle locking assembly 34 has the same elements as adapter locking assembly 10 and the same reference numerals are used to identify the parts of handle lock assembly 34 in FIG. 3B as FIG. 3A. Clamping fingers 80 of handle locking assembly 34 clamp against the outer surface of inner tube 40. The combination of handle locking assembly 34 and expandable locking mechanism 46 provides a secure connection between outer tube section 30 and inner tube section 32. The two locking points provided by the two locking mechanisms 34 and 46 are spaced apart from one another and work in opposite directions.

Figure 4:
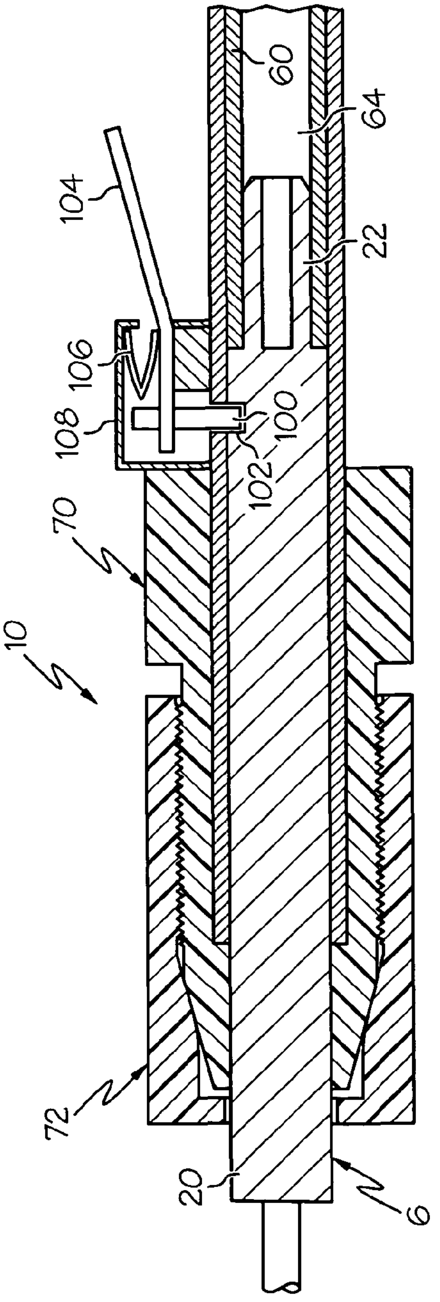
FIG. 4 is a section view similar to FIG. 3A depicting an alternative configuration for the adapter locking mechanism.

An alternate adapter locking assembly 10 is depicted in FIG. 4 wherein a locking pin 100 is used to secure adapter 6 to inner tube 40. Locking pin 100 may be used alone or in combination with adapter locking assembly 10. Locking pin 100 is movable between a locked configuration and an unlocked configuration. When locking pin 100 is in the locked configuration, locking pin 100 extends through inner tube 40 and into a recess 102 defined by first shank 20 of adapter 6. In an alternative configuration, locking pin 100 may extend through inner tube 40 and shock absorbing structure 60 and into a recess defined by second shank 22 of adapter 6. In another configuration, a pair of locking pins 100 may be used in both of these configurations. In the unlocked configuration, locking pin 100 is moved out of recess 102 so that adapter 6 may be removed from handle 4. In the configuration depicted in FIG. 4, first shank 20 is elongated to extend past adapter locking mechanism 10.

In one configuration, a thumb lever 104 is used to allow the user to lift pin 100 out of recess 102. A spring 106 is provided to bias pin 100 downwardly. Spring 106 may be located in a variety of places and provided in a variety of shapes and structures to provide this biasing force. A flat metal V-shaped spring 106 is depicted. A coil spring 106 carried on pin 100 also may be used. Spring 106 provides force that biases locking pin 100 toward recess 102 so that pin 100 will automatically snap into place when recess 102 is aligned with pin 100. Thumb lever 104 is also configured to lift pin 100 out of recess 102 when the user depresses thumb lever 104 toward inner tube 40. These structures may be located in a housing 108.

Figure 6:
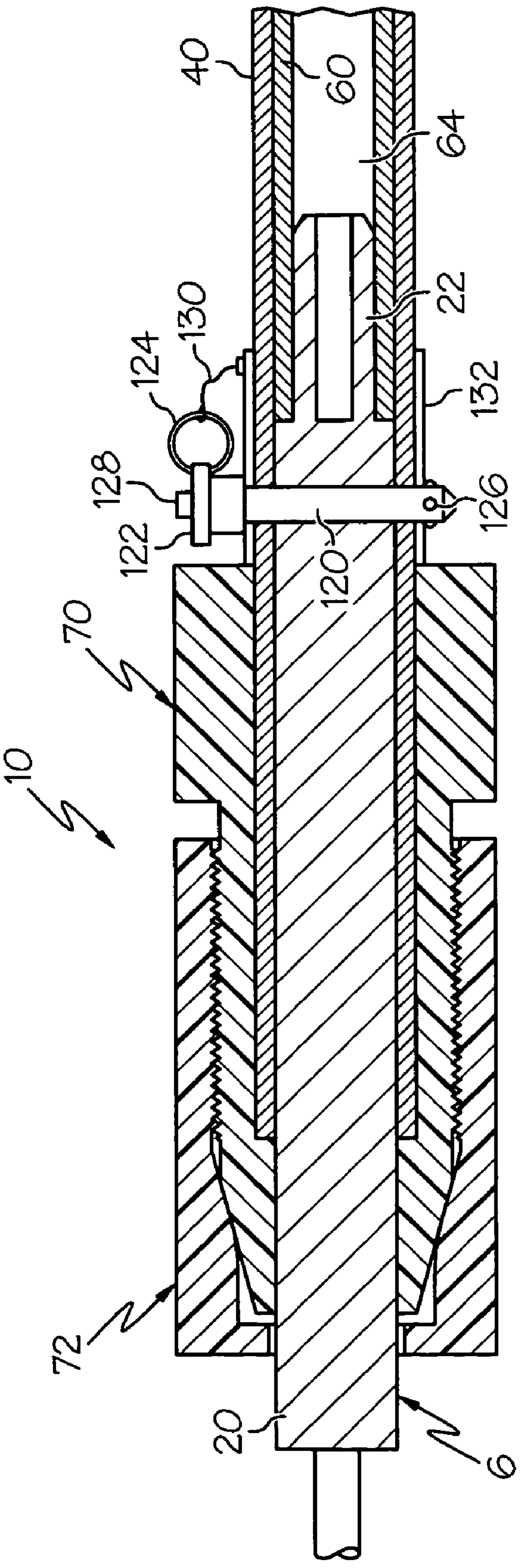
FIG. 6 is a section view of an alternative configuration where a removable pin is used to secure the tool head adapter to the handle.
Figure 7:
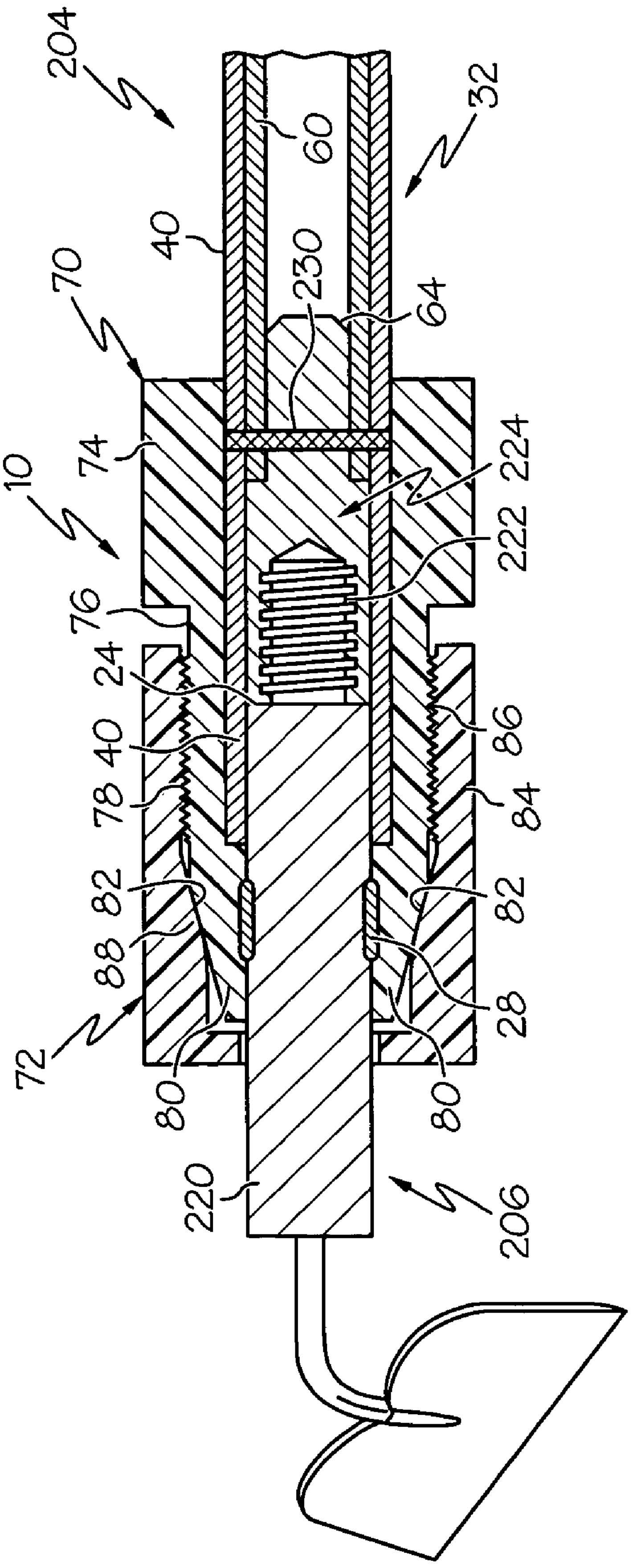
FIG. 7 is a section view of an alternative configuration wherein the tool head adapter is threaded to the handle.
Figure 8:
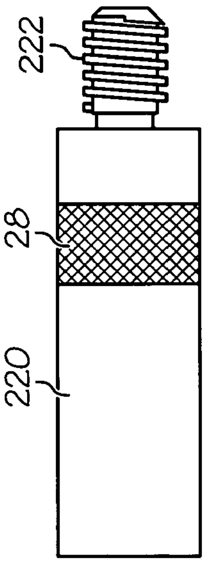
FIG. 8 is a side elevation view of a tool head adapter having a threaded male end.
Figure 9:
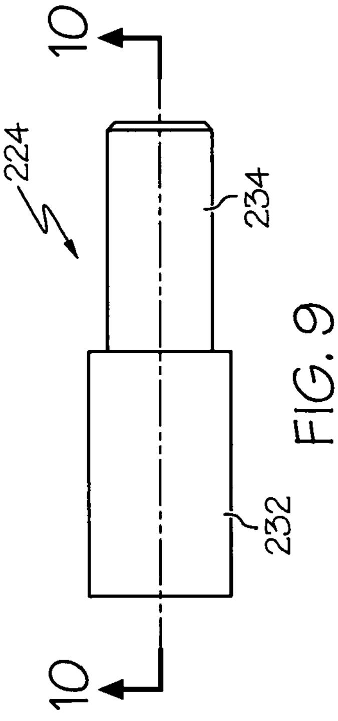
FIG. 9 is a side elevation view of a shank receiver that defines a threaded female cavity sized to receive the threaded male end of the tool head adapter.
Figure 10:
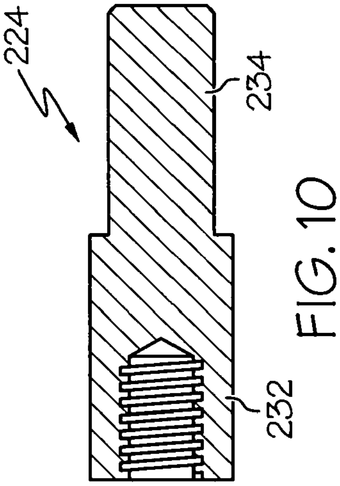
FIG. 10 is a section view taken along line 10-10 of FIG. 9.

In another configuration, pin 100 may be used with spring 106 without lever 104. In this configuration, the user pulls directly on pin 100 to remove it from recess 102. Such a configuration is shown in FIG. 6 wherein a removable pin 120 having a head 122 with a pull-ring 124 is disposed through inner tube 40 and first shank 20. Pin 120 may be a quick-release style locking pin having one or a plurality of ball detents 126 that function to lock pin 120 in place. A spring-biased center shaft 128 that projects through head 122 is used to release ball detents 126 to allow pin 120 to be removed. A lanyard 130 may be used to secure lock pin 120 to handle 4. FIG. 6 also depicts a configuration wherein an outer reinforcing sleeve 132 is provided outwardly of tube 40 to provide additional support for lock pin 120. Outer reinforcing sleeve 132 may be provided as separate element that slides over tube 40 or sleeve 132 may be an integral extension of inner portion 70 of adapter locking assembly 10. Sleeve 132 may be steel or a nylon sleeve about one inch long. Sleeve 132 may be secured with an adhesive or a mechanical connector such as a rivet, a pin, or a screw.

An alternative configuration of the tool of the invention is shown in FIGS. 7-10 wherein a threaded connection is formed between a tool head adapter 206 and a handle 204. Many of the same elements are used as described above and the reference numerals have been reused to show the same elements in this configuration of the invention. In this configuration, tool head adapter 206 includes a first shank 220 and a second shank 222 wherein second shank 222 forms a threaded connection with a shank receiver 224 carried by handle 204. The threaded connection is provided between a male threaded member and a female cavity that defines complementary thread reception structure. In the exemplary configuration shown in the drawings, the male threaded member is integrally connected with first shank 220 and may function as the entire second shank 222. Second shank 222 is threaded into a cavity defined by the end of shank receiver 224. In an alternative configuration, the relative position of the male threaded member and the threaded cavity may be reversed such that the male threaded member may be carried by shank receiver 224 while the threaded cavity is defined by second shank 222. In another configuration, second shank 222 may extend forwardly from shank receiver 224 to be threadedly received within a cavity defined by the end of first shank 220. The particular structure of the thread is not critical but an Acme thread may be used to secure tool head adapter 206 to handle 204. An Acme thread requiring eight rotations per inch may be used. Second shank 222 is sized to abut the end of shank receiver 224 before the thread is fully seated so that the user can tighten the two elements together as desired. Once the thread is tightened, the user secures adapter locking assembly 10 onto the knurled portion 28 of first shank 220 to provide an additional connection between the tool head and handle 204.

Shank receiver 224 is secured to handle 204 by an adhesive, an interference fit, or by mechanical connectors. One such mechanical connector may be a pin 230 that extends through inner tube 40 and a portion of shank receiver 224. The outer ends of pin 230 may be covered by inner portion 70 of adapter locking assembly 10 when handle 204 is assembled. In the exemplary configuration, shank receiver 224 includes a first portion 232 that is received directly inside inner tube 40 and a second portion 234 of reduced cross sectional area that is received in structure 60 similar to the manner in which second shank 22 is received by structure as described above. The second portion 234 of shank receiver 224 may have a non-circular cross section such that shank receiver 224 cannot rotate with respect to structure 60 even when pin 230 is not in place. First portion 224 abuts the forward end of structure 60 so that impact forces are transferred from receiver 224 to structure 60.

The use of the threaded connection between tool head adapter 206 and handle 204 provides a secure connection for the tool head that is especially resistant to pulling forces that are commonly experiences with rakes and hoes. Using a metal to form tool head adapter 220 and shank receiver 224, the two elements that define the threaded connection, also increases the strength of the tool.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Throughout the description and claims of this specification the word "comprise" and variations of that word, such as "comprises" and "comprising," are not intended to exclude additives, components, integers, or steps.

The invention claimed is:

1. A hand tool with interchangeable work heads, the tool comprising:
- at least a first tool work head;
- a handle having a first tube;
- the handle having a tool head adapter locking mechanism carried by the first tube with a portion of the first tube disposed inside the tool head adapter locking mechanism;
- a tool head adapter connected to the first tool work head; the tool head adapter having a first shank; the first shank of the tool head adapter being connected to the handle with a threaded connection; the threaded connection being disposed inside the first tube;
- the first shank having a clamping portion; and
- the tool head adapter locking mechanism having a clamped configuration and an unclamped configuration; a portion of the tool head adapter locking mechanism surrounding the clamping portion of the first shank of the tool head adapter and being clamped against the clamping portion of the first shank of the adapter to secure the tool head adapter to the first tube; the clamping portion of the first shank being disposed intermediate the threaded connection and the first tool work head and outside of the first tube of the handle.

2. The tool of claim 1, further comprising a shank receiver carried inside the first tube of the handle; the first shank of the tool head adapter being connected to the shank receiver with the threaded connection.

3. The tool of claim 2, wherein a portion of the first shank directly abuts a portion of the shank receiver.

4. The tool of claim 3, wherein the abutting portions of the first shank and the shank receiver are disposed within the first tube of the handle.

5. The tool of claim 2, wherein the handle includes a shock absorbing structure disposed inside the first tube; the shank receiver including a first portion disposed inside the first tube and a second portion disposed inside the shock absorbing structure.

6. A hand tool with interchangeable work heads, the tool comprising:
- at least a first tool work head;
- a handle having a first tube;
- the handle having a tool head adapter locking mechanism;
- a tool head adapter connected to the first tool work head; the tool head adapter having a first shank;
- the first shank having a clamping portion;
- the tool head adapter locking mechanism having a clamped configuration and an unclamped configuration; a portion of the tool head adapter locking mechanism surrounding the clamping portion of the first shank of the tool head adapter and being clamped against the clamping portion of the first shank of the adapter to secure the tool head adapter to the first tube;
- a shank receiver carried by the first tube of the handle;
- the first shank of the tool head adapter being connected to the shank receiver with a threaded connection;
- the handle including a shock absorbing structure disposed inside the first tube; the shank receiver including a first portion disposed inside the first tube and a second portion disposed inside the shock absorbing structure; and
- a connector securing the second portion of the shank receiver to the shock absorbing structure and the first tube.

7. The tool of claim 6, wherein the connector is disposed under a portion of the tool head adapter locking mechanism.

8. The tool of claim 6, wherein the shank receiver defines a shoulder between the first portion of the shank receiver and the second portion of the shank receiver; the shoulder abutting the shock absorbing structure.

9. The tool of claim 6, wherein the handle further comprises an second tube carrying a handle locking mechanism; a portion of the first tube being disposed in the second tube.

10. A hand tool with interchangeable work heads, the tool comprising:

at least a first tool work head having a tool head adapter that includes a first shank;

a telescoping handle having a first tube that selectively slides inside a second tube; a portion of the first tube being disposed inside the second tube;

the second tube carrying a handle locking mechanism that is movable between clamped and unclamped configurations; the clamped configuration of the handle locking mechanism locking the position of the first tube with respect to the second tube;

the first tube carrying a tool head adapter locking mechanism;

the first shank of the tool head adapter having a clamping portion;

the tool head adapter locking mechanism having a clamped configuration and an unclamped configuration; a portion of the tool head adapter locking mechanism surrounding the clamping portion of the first shank of the tool head adapter and being clamped against the clamping portion of the first shank of the adapter to secure the tool head adapter to the first tube when the tool head adapter locking mechanism is in the clamped configuration; and the first tube carrying an expandable locking mechanism; the expandable locking mechanism being disposed inside the second tube; the expandable locking mechanism having locked and unlocked configurations; the locked configuration of the expandable locking mechanism securing the first tube to the second tube.

11. The tool of claim 10, wherein the handle includes a shock absorbing structure disposed inside the first tube; the first shank abutting the shock absorbing structure; the shock absorbing structure abutting a portion of the expandable locking mechanism.

12. The tool of claim 10, further comprising a shank receiver and a shock absorbing structure carried by the handle; the shank receiver threadedly receiving the first shank; the shank receiver abutting the shock absorbing structure; and a connector securing the shank receiver and the shock absorber to the first tube.

13. The tool of claim 10, wherein the handle locking mechanism carried by the second tube includes an inner portion that includes a grip disposed outwardly of the second tube; the inner portion also including an intermediate tube having an outwardly disposed thread; the inner portion further including a plurality of clamping fingers that define an outer cam follower surface;

the plurality of clamping fingers projecting over a portion of the first tube;

the handle locking mechanism also including an outer portion that threadedly engages the outwardly disposed thread of the intermediate tube; and the outer portion having a cam that engages the cam follower surface of the clamping fingers such that the outer portion is adapted to force the clamping fingers against the inner tube.

14. The tool of claim 13, wherein the expandable locking mechanism is disposed inwardly of the grip to align an expansion force created by the expandable locking mechanism with the grip.

15. A hand tool with interchangeable work heads, the tool comprising:

at least a first tool work head;

a handle having a first tube;

the handle having a tool head adapter locking mechanism;

a tool head adapter connected to the first tool work head; the tool head adapter having a first shank; the first shank of the tool head adapter being connected to the handle with a threaded connection;

the first shank having a clamping portion;

the tool head adapter locking mechanism having a clamped configuration and an unclamped configuration; a portion of the tool head adapter locking mechanism surrounding the clamping portion of the first shank of the tool head adapter and being clamped against the clamping portion of the first shank of the adapter to secure the tool head adapter to the first tube when the tool head adapter locking mechanism is in the clamped configuration; and the tool head adapter locking mechanism including a first portion connected to the first tube and a second portion threadedly engaging the first portion; the first portion defining a plurality of clamping fingers engaging the first shank of the tool head adapter.

16. A hand tool with interchangeable work heads, the tool comprising:

at least a first tool work head;

a handle having a first tube;

the handle having a tool head adapter locking mechanism;

a tool head adapter connected to the first tool work head;

the tool head adapter having a first shank and a second shank; the first shank defining a clamping portion and the second shank defining a thread;

a shank receiver carried by the first tube of the handle; the shank receiver defining a recess that threadedly receives the second shank to threadedly connect the tool head adapter to the handle with a threaded connection;

a portion of the first shank being disposed inside the first tube with the clamping portion of the first shank being disposed outside the first tube; and the tool head adapter locking mechanism having a clamped configuration and an unclamped configuration; a portion of the tool head adapter locking mechanism surrounding the clamping portion of the first shank of the tool head adapter and being clamped against the clamping portion of the first shank of the adapter to secure the tool head adapter to the first tube.

17. The tool of claim 16, wherein a portion of the first shank directly abuts a portion of the shank receiver; the abutting portions of the first shank and the shank receiver being disposed within the first tube of the handle.

18. The tool of claim 16, wherein the handle includes a shock absorbing structure disposed inside the first tube; the shank receiver including a first portion disposed inside the first tube and a second portion disposed inside the shock absorbing structure.

19. A hand tool with interchangeable work heads, the tool comprising:

a tool work head;

a tool head adapter having a first shank and a second shank with a shoulder defined between the first and second shanks; the tool head adapter being connected to the tool work head;

a handle having a tool head adapter locking mechanism carried by a first tube;

a shock absorbing structure disposed inside the first tube; the shock absorbing structure defining an opening;

the second shank of the adapter disposed in the opening defined by the shock absorbing structure;

at least a portion of the first shank being disposed inside the first tube;

the shoulder of the adapter abutting the shock absorbing member;

the tool head adapter locking mechanism having a clamped configuration and an unclamped configuration; a portion of the tool head adapter locking mechanism surrounding a clamping portion of the first shank of the adapter and being clamped against the clamping portion of the first shank of the adapter to secure the tool head adapter to the inner tube; and the first shank being connected to the first tube with a removable and replaceable pin that extends through the first shank and the first tube; the tool head adapter locking mechanism being disposed between the pin and the tool work head.

20. The tool of claim 19, further comprising an outer sleeve disposed around the first tube; the pin being disposed through the outer sleeve.

* * * * *